United States Patent
Nimmagadda

(10) Patent No.: US 10,338,846 B2
(45) Date of Patent: Jul. 2, 2019

(54) METHOD FOR REDUCING READ BUFFER SIZE REQUIREMENTS IN NVME BASED SOLID STATE DRIVES

(71) Applicant: Samsung Electronics Co., Ltd., Suwon-si, Gyeonggi-do (KR)

(72) Inventor: Venkataratnam Nimmagadda, Bangalore (IN)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 37 days.

(21) Appl. No.: 15/634,201

(22) Filed: Jun. 27, 2017

(65) Prior Publication Data
US 2018/0059987 A1    Mar. 1, 2018

(30) Foreign Application Priority Data

Aug. 31, 2016   (IN) ............................. 201641029691

(51) Int. Cl.
| | |
|---|---|
| *G06F 12/00* | (2006.01) |
| *G06F 3/06* | (2006.01) |
| *G06F 12/02* | (2006.01) |
| *G06F 12/0866* | (2016.01) |

(52) U.S. Cl.
CPC .......... *G06F 3/0656* (2013.01); *G06F 3/0626* (2013.01); *G06F 3/0679* (2013.01); *G06F 12/00* (2013.01); *G06F 12/0238* (2013.01); *G06F 12/0246* (2013.01); *G06F 12/0866* (2013.01); *G06F 2212/1044* (2013.01); *G06F 2212/1056* (2013.01); *G06F 2212/7203* (2013.01)

(58) Field of Classification Search
CPC .... G06F 3/0656; G06F 3/0626; G06F 3/0679; G06F 12/00; G06F 3/0238; G06F 3/0246; G06F 3/0866
See application file for complete search history.

(56) References Cited

U.S. PATENT DOCUMENTS

2018/0005670 A1*   1/2018   Lee ........................ G06F 3/061

\* cited by examiner

*Primary Examiner* — Shawn X Gu
(74) *Attorney, Agent, or Firm* — Harness, Dickey & Pierce, P.L.C.

(57) ABSTRACT

Embodiments herein provide a method for managing a read buffer queue in a data storage system to reduce the read buffer size requirements. The method includes receiving a read command from a NVMe host to fetch data from a flash of a NVMe device. Further, the method includes placing a portion of the data fetched from a flash in a read buffer queue in the NVMe device controller. The read buffer queue includes a plurality of segments to accommodate individual portion of the data fetched from the flash. Furthermore, the method includes indicating presence of each portion of data in the plurality of segments of the read buffer queue to the NVMe host.

17 Claims, 4 Drawing Sheets

METHOD FOR REDUCING READ BUFFER SIZE REQUIREMENTS IN NVME BASED SOLID STATE DRIVES

CROSS-REFERENCE TO RELATED APPLICATION

This application claims priority from Indian Patent Application No. 201641029691 filed on Aug. 31, 2016 in the Intellectual Property India, and all the benefits accruing therefrom under 35 U.S.C. 119, the contents of which in its entirety are herein incorporated by reference.

BACKGROUND

1. Technical Field

Example embodiments herein generally relate to data storage systems. For example, at least some example embodiments relate to a data storage system and/or method for reducing read buffer size requirements in NVMe based solid state drives (SSDs).

2. Description of the Related Art

Various standards and protocols regarding data storage devices have been promulgated by standard bodies and industry consortia. One standard associated with data storage devices is non-volatile memory express (NVMe). The NVMe describes a standardized register level interface which enables a communication between a host device and a data storage device that is compatible with a peripheral component interconnect express (PCIe). The NVMe standard may be used, for example, with data storage devices that incorporate solid-state drive (SSD) memory, such as NAND flash memory.

According to the NVMe specification, the host device may place commands, such as read (RD) commands or write (WR) commands in queue(s), for the data storage device. The data storage device may retrieve the commands from the queue(s), and may execute the commands. The RD commands and WR commands may include (e.g., parameters) information that enables the data storage device to execute the command. For example, a RD command may include a memory address in a non-volatile memory (NVM) from which data is to be read. The read command may include a pointer to a physical region pages (PRP) or scatter gather list (SGL), where the PRP or the SGL identifies logical blocks of data to be transferred to the host device.

In the conventional systems, the NVMe host may send many RD commands to the data storage device to make all the pipeline stages from NVMe host to the NVMe based data storage device (e.g., the SSD) fully occupied. Before forming the RD commands, a NVMe host driver may allocate or reserve RD data buffers in the NVMe host or in a memory buffer associated with the NVMe based data storage device's controller to store the commands under preparation.

When the RD buffer is allocated in the memory buffer associated with the NVMe based data storage device, the RD buffer may place relatively large demand requirements on the NVMe based data storage device. Hence, it may be desirable to reduce the RD buffer when the RD buffer is on the NVMe based data storage device itself.

The above information is presented as background information only to help the reader to understand example embodiments.

SUMMARY

At least some example embodiments herein are directed to a method for reducing read buffer size requirements in NVMe based solid state drives (SSDs).

Other example embodiments herein are directed to a method for managing a read buffer queue in a data storage system.

Accordingly, at least some example embodiments are related to a data storage system.

In some example embodiments, the data storage system includes a non-volatile memory express (NVMe) host; and a NVMe device including a NVMe device controller configured to, receive a read command from the NVMe host, the read command instructing the NVMe device to fetch data, place a portion of the data fetched from a flash in a read buffer queue in the NVMe device controller, the read buffer queue including a plurality of segments to accommodate individual portion of the data fetched from the flash, and indicate a presence of the portion of data in the read buffer queue to the NVMe host.

Accordingly, at least some example embodiments are related to a method for managing a read buffer queue in a data storage system.

In some example embodiments, the method includes receiving, by a non-volatile memory express (NVMe) device controller, a read command from the NVMe host, the read command instructing the NVMe device controller to fetch data from a flash; placing, by the NVMe device controller, a portion of data fetched from the flash, in a read buffer queue, the read buffer queue including a plurality of segments to accommodate a portion of the data fetched from the flash; and indicating, by the NVMe device controller, a presence of the portion of data in the read buffer queue, to the NVMe host.

Accordingly, at least some example embodiments are related to a non-transitory computer readable medium storing computer executable program code.

In some example embodiments, the computer executable program, when executed by a non-volatile memory express (NVMe) device controller, causes the NVMe device controller to, receive, a read command from a NVMe host, the read command instructing the NVMe device controller to fetch data; place, a portion of the data fetched from a flash, in a read buffer queue in the NVMe device controller, the read buffer queue including a plurality of segments each configured to accommodate a portion of the data fetched from the flash; and indicate, a presence of the portion of the data in the read buffer queue to the NVMe host.

Some example embodiments relate to a non-volatile memory express (NVMe) device.

In some example embodiments, the NVMe device includes a controller configured to, fetch data from a non-volatile memory device, store portions of the data in segments of a read buffer queue associated with the controller, and set a first flag indicating a presence of the portions of the data in the read buffer queue.

These and other aspects of the example embodiments herein will be better appreciated and understood when considered in conjunction with the following description and the accompanying drawings. It should be understood, however, that the following descriptions, while indicating some example embodiments and numerous specific details thereof, are given by way of illustration and not of limitation. Many changes and modifications may be made within the scope of the example embodiments herein without departing from the spirit thereof, and the example embodiments herein include all such modifications.

BRIEF DESCRIPTION OF THE DRAWINGS

Example embodiments illustrated in the accompanying drawings, throughout which like reference letters indicate corresponding parts in the various figures. The example embodiments herein will be better understood from the following description with reference to the drawings, in which.

DETAILED DESCRIPTION

The example embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the example embodiments herein. Also, the various example embodiments described herein are not necessarily mutually exclusive, as some embodiments can be combined with one or more other embodiments to form new example embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the example embodiments herein. Accordingly, the examples should not be construed as limiting the scope of the example embodiments herein.

Some of the example embodiments herein provide a method for managing a read (RD) buffer queue in a data storage system. The method may include receiving a RD command from non-volatile memory express (NVMe) host to fetch data from a flash of the NVMe device. Further, the method may include placing a portion of the data fetched from the flash in a RD buffer queue in the NVMe device controller. The RD buffer queue may include a plurality of segments to accommodate individual portion of the data fetched from the flash. Furthermore, the method may include indicating presence of portion of the data in the plurality of segments of the RD buffer queue to the NVMe host.

Unlike the conventional systems and methods, the proposed method may be used to reduce the RD buffer size requirements in the NVMe SSDs without compromising (or, alternatively, with minor compromises to) performance. The reduced RD buffer size may reduce the gate count and/or cost of the SSD when the RD buffer is placed in the NVMe controller memory buffer. The proposed method may allow the NVMe host to issue RD commands without constraints or dependencies on allocating the RD buffer. Further, the proposed method may reduce (or, alternatively, avoid) the latencies due to physical region pages (PRP) or scatter gather list (SGL) fetching for RD command execution. The proposed method may simplify the design of the NVMe device as the sequential linked list management of RD buffer pointers in the NVMe device may be avoided. Furthermore, the proposed method may save the static random access memory (SRAM) resources used for PRP/SGL buffering in NVMe device for commands execution in the NVMe device.

Figure 1:
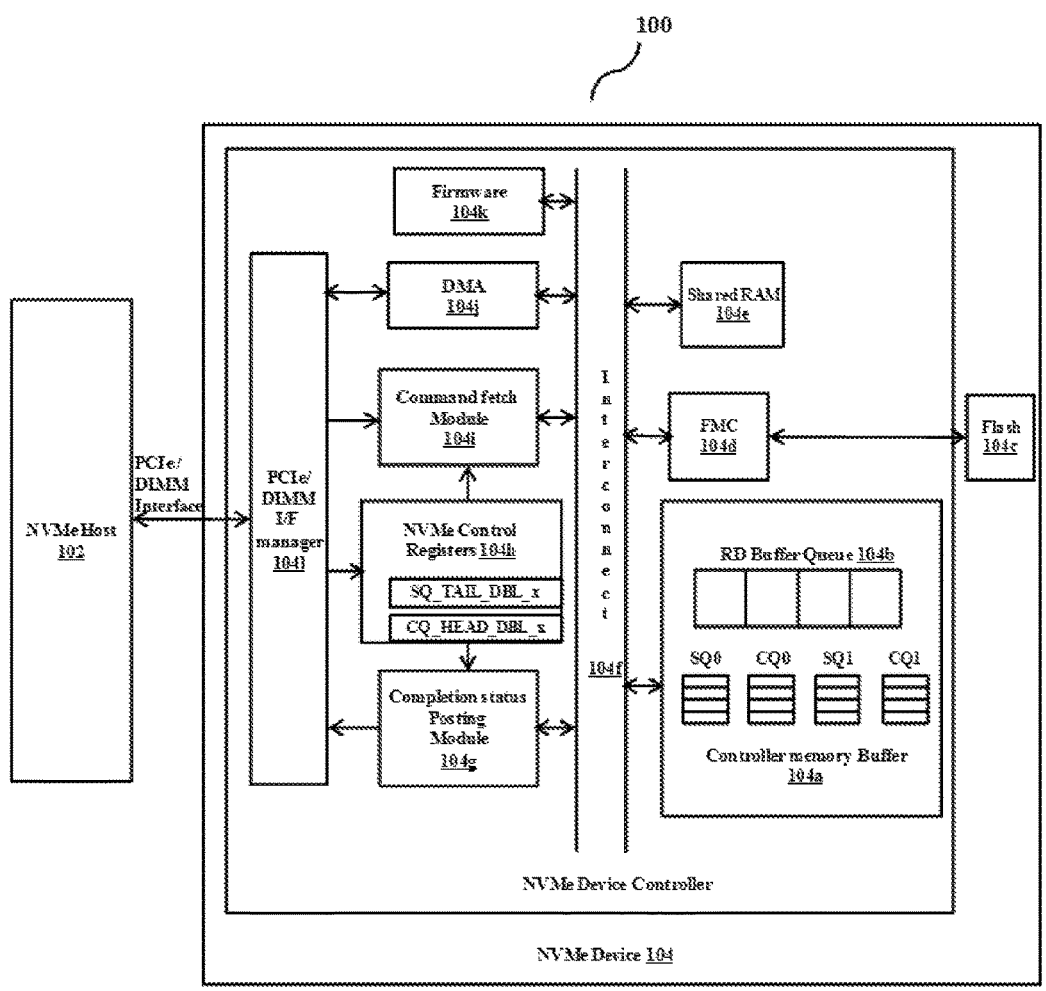
FIG. 1 illustrates a data storage system for managing a read buffer queue in a non-volatile memory express (NVMe) device, according to an example embodiment.

FIG. 1 illustrates a data storage system 100 for managing a read (RD) buffer queue in a non-volatile memory express (NVMe) device, according to an example embodiment as disclosed herein.

Referring to FIG. 1, the data storage system 100 may include a NVMe host 102 and a NVMe device 104. The NVMe host 102 can be any one of various devices, for example, mobile, portable or hand held devices like smart phones, laptop computers, server computers, personal digital assistants (PDAs) or the like. The NVMe device 104 can be any of a PCIe/DIMM interface NVMe based SSD, or the like.

In an example embodiment, the NVMe device 104 includes a NVMe device controller and a flash storage 104c. The NVMe device controller may include a controller memory buffer 104a, a flash memory controller (FMC) 104d, a shared RAM 104e, an interconnect 104f, a completion status posting module 104g, NVMe control registers 104h, a command fetch module 104i, direct memory access (DMA) 104j, a firmware 104k, a peripheral component interconnect express (PCIe)/DIMM bus 104l.

The controller memory buffer 104a may include a read (RD) buffer queue 104b and submission queues and completion queues, for example SQ0, SQ1 and CQ0, CQ1 respectively.

The flash storage 104c may be a non-volatile media that consists of array of NAND Flash memory. Flash memory controller (FMC) 104d may manage/control the flash storage 104c operations.

Shared RAM 104e may be used for various purposes such as cache memory/temporary storage memory etc. On chip interconnect 104f may be used to route the data/control information from multiple masters to multiple slaves to execute the command.

Completion status posting module 104g posts the partial completion queue entry in completion queue when the portion of data for a command is available in RD buffer. NVMe control registers 104h provides the access to NVMe specific registers like doorbell registers. Command fetch module 104i fetches the command from a submission queue when the corresponding SQ has new doorbell event. DMA 104j is responsible for moving the data from FMC to RD buffer. Firmware 104k may control the modules of NVMe device controller. PCIe/DIMM interface 104l may provide the NVMe device 104 access to NVMe Host 102.

The interconnect 104f is coupled to the controller memory buffer 104a, the FMC 104d, the shared RAM 104e, firmware 104k, the DMA 104j, the command fetch module 104i and the completion status posting module 104g. Additionally the DMA 104j is coupled to the PCIe/DIMM 104l. The NVMe host 102 is coupled to the PCIe/DIMM 104l.

The NVMe device controller is configured to receive data and commands from the NVMe host 102 and to send data to the NVMe host 102.

In an example embodiment, the NVMe device controller is configured to receive a RD command from the NVMe host 102 to fetch data from flash 104c of the NVMe device 104. The NVMe device controller is configured to place the portion of the data fetched from the flash 104c in the RD buffer queue 104b. The RD buffer queue 104b includes a plurality of segments to accommodate individual portion of data fetched from the flash 104c. The NVMe device controller is configured to indicate the presence of the portion of the data present in the plurality of the segments in the RD buffer queue 104b to the NVMe host 102 through a partial completion queue entry. The NVMe host 102 can read the corresponding data in the plurality of the segments of the RD buffer queue 104b after checking the partial CQ entry from the NVMe device controller based on the partial or full data transfer.

Figure 2:
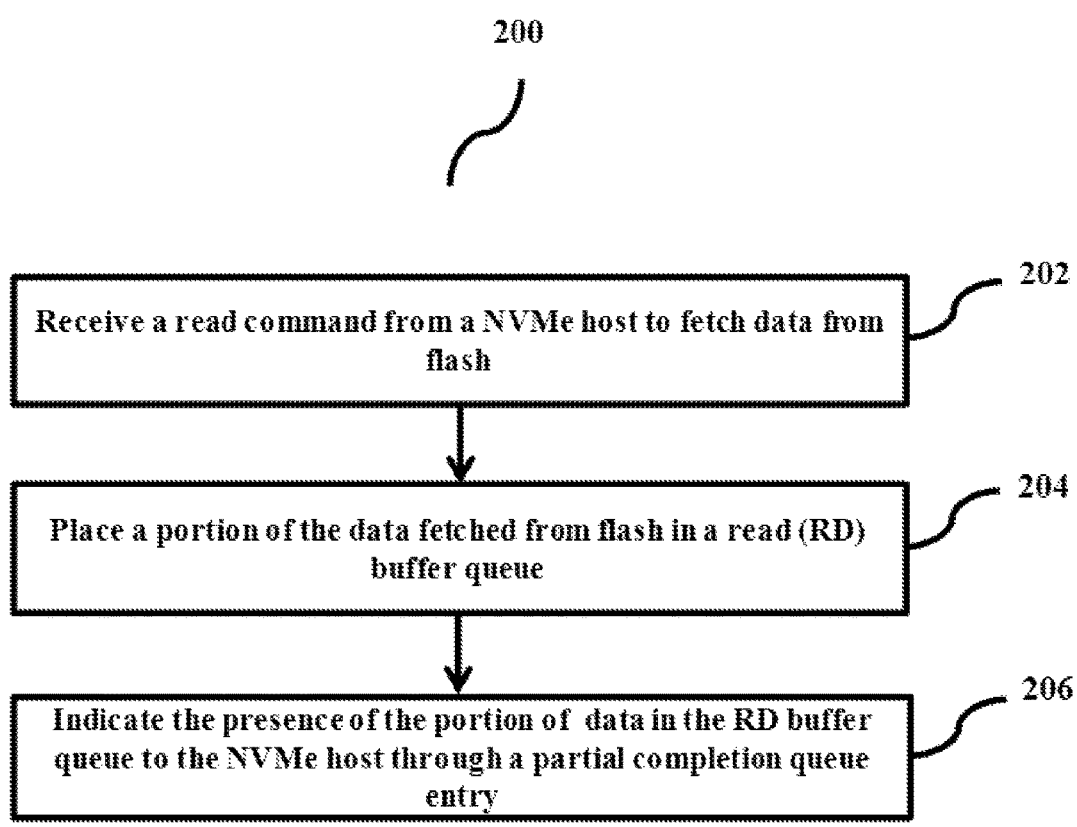
FIG. 2 is a flow chart illustrating a method for managing the read buffer queue in the data storage system, according to an example embodiment.

FIG. 2 is a flow chart illustrating a method 200 for managing the RD buffer queue in the data storage system 100, according to some example embodiments as disclosed herein.

Referring to FIG. 2, in some example embodiment, at operation 202, the method 200 the NVMe device controller may receive a RD command from the NVMe host 102. In some example embodiments, the RD command may instruct the NVMe device controller to fetch data from the flash 104c.

At operation 204, the NVMe device controller may place a portion of the data fetched, in the RD buffer queue 104b in the NVMe device 104. For example, the NVMe device controller may place a portion of the fetched data from the flash 104c in the RD buffer queue 104b of the controller memory buffer 104a. The RD buffer queue 104b includes a plurality of segments to accommodate individual portion of the data fetched from the flash 104c.

At operation 206, the NVMe device controller may indicate a presence of each portion of the fetched data in the plurality of segments of the RD buffer queue 104b in the NVMe device controller to the NVMe host 102 through a partial completion queue entry in the CQ0, CQ1. Completion queues can be placed in controller memory buffer 104a of NVMe device 104 or in host 102.

In an example embodiment, the partial completion queue entry includes details of logical blocks and command details for the data in the RD buffer queue 104b. The NVMe host 102 reads the data from the RD buffer queue 104b whenever the NVMe host 102 detects the partial completion queue entry.

The method 200 and other description described above provide a basis for a control program, which can be implemented using a microcontroller, microprocessor, or any computer readable storage medium The various actions, acts, blocks, steps, or the like in the method 200 may be performed in the order presented, in a different order or simultaneously. Further, in some example embodiments, some of the actions, acts, blocks, steps, or the like may be omitted, added, modified, skipped, or the like without departing from the scope of the example embodiments.

Figure 3:
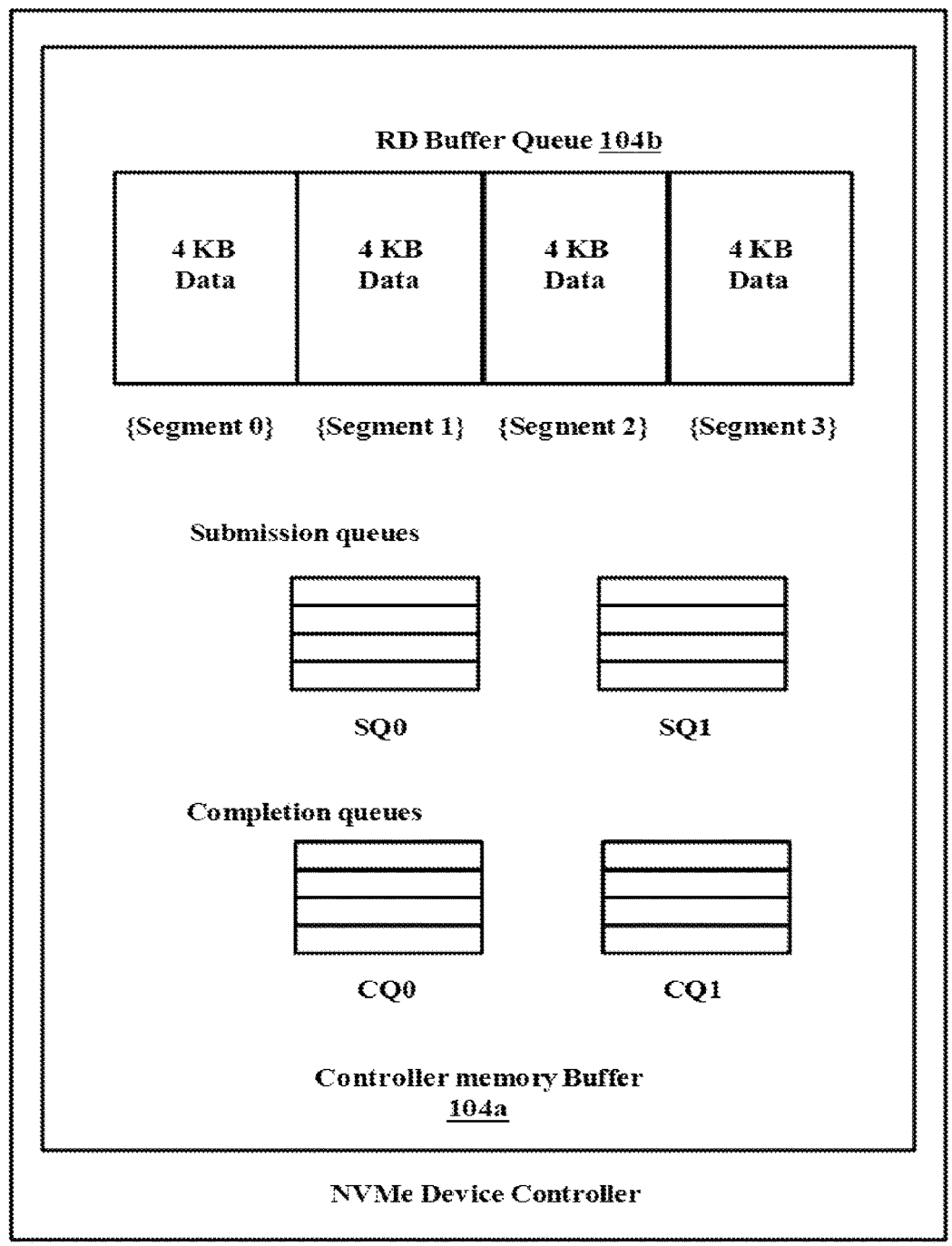
FIG. 3 shows an example scenario illustrating individual portion of data placed in the plurality of segments in the read buffer queue, according to an example embodiment.

FIG. 3 shows an example scenario illustrating individual portion of data placed in the plurality of segments in the RD buffer queue 104b, according to an example embodiment as disclosed herein.

Referring to FIG. 3, in an example embodiment, the RD buffer 104b contains four segments, segment 0 through segment 3. In response to RD command from the NVMe host 102, the NVMe device controller may fetch data from the flash 104c of the NVMe device 104 and the NVMe device controller may place the data in the RD buffer queue 104b in the NVMe device controller. For example, if a data of 16 KB size is fetched from the flash 104c, the NVMe device controller fetches the data sequentially or randomly in portions of 4 KB each into one of the four segments of the RD buffer 104b.

In an example embodiment, the NVMe device controller may send a partial completion queue entry based on partial data transfer completion i.e. corresponding to each of the 4 KB data portion transferred to the read buffer queue 104b.

The NVMe host 102 can read the corresponding data in the plurality of the segments of the RD buffer queue 104b after checking the partial completion queue entry from the NVMe device controller based on the partial or full data transfer. After reading the data, the NVMe host 102 may acknowledge the partial completion queue entry by writing the RD buffer queue 104b head pointer allowing the NVMe device 104 to re-use the RD buffer queue 104b. Entry size of the RD buffer queue 104b can be kept as the minimum logical block addressing (LBA) size supported by the NVMe device 104. For example, if a minimum LBA size is 512B and the NVMe host 102 updates the RD buffer queue 104b head pointer as 8, then 4 KB of RD buffer queue 104c segment may be released by the NVMe host 102.

Figure 4:
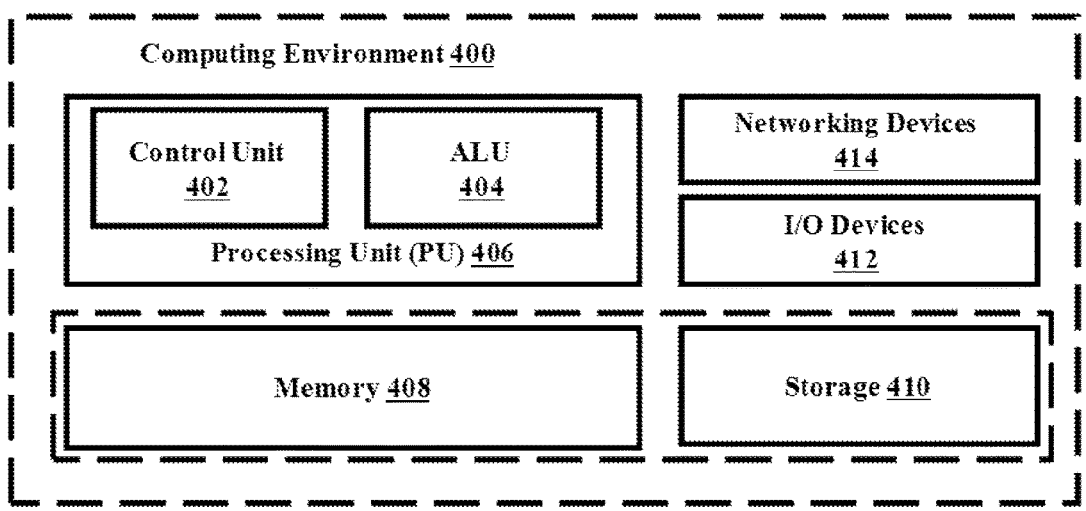
FIG. 4 is a computing environment implementing the method for managing the read buffer queue in the data storage system, according to an example embodiment.

FIG. 4 is a computing environment implementing the method for managing the RD buffer size in a data storage system, according to an example embodiment disclosed herein.

Referring to FIG. 4, the computing environment 400 may include at least one processing unit 406 that is equipped with a control unit 402 and an Arithmetic Logic Unit (ALU) 404, a memory 408, a storage unit 410, plurality of networking devices 414 and a plurality of Input output (I/O) devices 412. The processing unit 406 may be responsible for processing the instructions of the algorithms. The processing unit 406 receives commands from the control unit 402 in order to perform its processing. Further, logical and arithmetic operations involved in the execution of the instructions may be computed with the help of the ALU 404.

The overall computing environment 400 can be composed of multiple homogeneous and/or heterogeneous cores, multiple CPUs of different kinds, special media and other accelerators. The processing unit 406 may be responsible for processing the instructions of the algorithms. Further, the plurality of processing units 406 may be located on a single chip or over multiple chips.

The algorithms may include instructions and codes stored in either the memory unit 408 or the storage 410 or both. At the time of execution, the instructions may be fetched from the corresponding memory 408 or storage 410, and executed by the processing unit 406.

In case of any hardware implementations, various networking devices 414 or external I/O devices 412 may be connected to the computing environment to support the implementation through the networking unit and the I/O device unit.

The example embodiments disclosed herein can be implemented through at least one software program running on at least one hardware device and performing network management functions to control the elements. The elements shown in the FIGS. 1 through 4 include blocks which can be at least one of a hardware device, or a combination of hardware device and software module.

The foregoing description of some example embodiments will so fully reveal the general nature of the example embodiments herein that others can, by applying current knowledge, readily modify and/or adapt for various applications such specific embodiments without departing from the example embodiment, and, therefore, such adaptations and modifications should and are intended to be comprehended within the meaning and range of equivalents of the disclosed example embodiments. It is to be understood that the phraseology or terminology employed herein is for the purpose of description and not of limitation. Therefore, while the example embodiments herein have been described in terms of some example embodiments, those skilled in the art will recognize that the example embodiments herein can be practiced with modification within the spirit and scope of the example embodiments as described herein.

What is claimed is:

1. A data storage system comprising:
a non-volatile memory express (NVMe) host; and
a NVMe device including a NVMe device controller configured to,
receive a read command from the NVMe host, the read command instructing the NVMe device to fetch data,
place a portion of the data fetched from a flash in a read buffer queue in the NVMe device controller, the read buffer queue including a plurality of segments to accommodate individual portion of the data fetched from the flash,
indicate a presence of the portion of the data in the read buffer queue to the NVMe host, and
receive an acknowledgment from the NVMe host, the acknowledgment indicating that the data in the read buffer queue can be rewritten.

2. The data storage system of claim 1, wherein the NVMe host is configured to obtain the portion of the data in the read buffer queue.

3. The data storage system of claim 1, wherein the NVMe device controller is configured to iteratively indicate to the NVMe host when new ones of the portion of the data are in the read buffer queue.

4. The data storage system of claim 1, wherein the NVMe device controller is configured to indicate the presence of the portion of the data in the read buffer queue via a partial completion queue entry.

5. The data storage system of claim 1, wherein the NVMe device controller is configured to receive the acknowledgment from the NVMe host, the acknowledgment being an indication written to the read buffer queue instructing the NVMe device controller that the data in the read buffer queue can be rewritten.

6. A method for managing a read buffer queue in a data storage system, the method comprising:
receiving, by a non-volatile memory express (NVMe) device controller, a read command from a NVMe host, the read command instructing the NVMe device controller to fetch data from a flash;
placing, by the NVMe device controller, a portion of data fetched from the flash, in the read buffer queue, the read buffer queue including a plurality of segments to accommodate the portion of the data fetched from the flash;
indicating, by the NVMe device controller, a presence of the portion of data in the read buffer queue, to the NVMe host; and
receiving, by the NVMe device controller, an acknowledgment from the NVMe host, the acknowledgment indicating that the data in the read buffer queue can be rewritten.

7. The method of claim 6, wherein the indicating iteratively indicates the presence to the NVMe host when a new portion of data is in the read buffer queue.

8. The method of claim 6, wherein the indicating comprises:
indicating the portion of data in the plurality of segments of the read buffer queue to the NVMe host via a partial completion queue entry.

9. A non-transitory computer readable medium storing computer executable program code that, when executed by the non-volatile memory express (NVMe) device controller, causes the NVMe device controller to execute the method of claim 6.

10. The non-transitory computer readable medium of claim 9, wherein the computer executable program code, when executed, further configures the NVMe device controller to,
indicate the presence to the NVMe host when a new portion of data is present in the read buffer queue.

11. The non-transitory computer readable medium of claim 9, wherein the computer executable program code, when executed, further configures the NVMe device controller to,
indicate the presence of the portion of the data in the plurality of segments of the read buffer queue to the NVMe host via a partial completion queue entry.

12. The method of claim 6, further comprising:
receiving, by the NVMe device controller, the acknowledgment from the NVMe host, wherein
the acknowledgment is an indication written to the read buffer queue, instructing the NVMe device controller that the data in the read buffer queue can be rewritten.

13. A non-volatile memory express (NVMe) device, comprising:
a controller configured to,
fetch data from a non-volatile memory device in response to a read command from a NVMe host,
store portions of the data in segments of a read buffer queue associated with the controller,
set a first flag indicating a presence of the portions of the data in the read buffer queue, and
receive an acknowledgment from the NVMe host, the acknowledgment indicating that the data in the read buffer queue can be rewritten.

14. The NVMe device of claim 13, wherein the controller is further configured to,
receive the read command from the NVMe host, the read command instructing the NVMe device to fetch the data from the non-volatile memory device, and
indicate the presence of the portions of the data to the NVMe host via the first flag.

15. The NVMe device of claim 14, wherein the controller is further configured to
set the first flag by storing data in a partial completion queue.

16. The NVMe device of claim 14, wherein the controller is configured to receive the acknowledgment from the NVMe host, the acknowledgment being a second flag written to the read buffer queue, the second flag instructing the controller that the data in the read buffer queue can be rewritten.

17. The NVMe device of claim 16, wherein the second flag is a head pointer.

* * * * *